Jan. 15, 1935.  P. B. GODDARD ET AL  1,987,678

UNIVERSAL JOINT AND COVER

Filed March 18, 1933

INVENTORS.
Paul B. Goddard.
Frank Ketcham.
BY Harness, Dickey, Pierce & Hann.
ATTORNEYS.

Patented Jan. 15, 1935

1,987,678

UNITED STATES PATENT OFFICE 1,987,678

UNIVERSAL JOINT AND COVER

Paul B. Goddard and Frank Ketcham, Dearborn, Mich., assignors to Universal Products Co. Inc., a corporation of Delaware Application March 18, 1933, Serial No. 661,444

1 Claim. (Cl. 64—103)

This invention relates to universal joints.

The main objects of this invention are to provide an improved assembly of joint in which the component parts are permanently retained within the housing; to provide an improved cover which seals lubricant within the joint, excludes dust and dirt prior to final assembly on the vehicle, and which serves as a spring seat for holding the base of the spring in definite position.

An illustrative embodiment of this invention is shown in the accompanying drawing, in which:—

Figure 1:
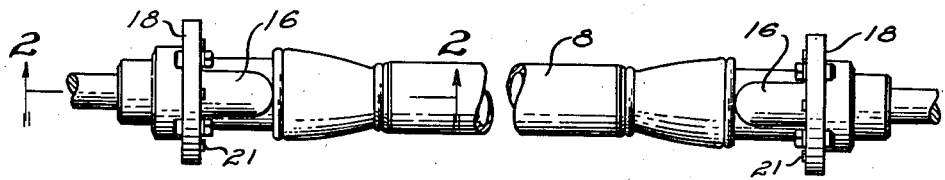
Fig. 1 is a fragmentary view in elevation of a propeller shaft assembly embodying the improved invention.

Heretofore in the manufacture and assembly of universal joints of the character herein shown and described, it has been customary to furnish the propeller shaft assemblies with universal joints at the respective ends thereof to the automobile manufacturers assembly line with no permanent closure on that end of the housings of the universal joints which abut against and are secured to companion flanges of the drive shafting.

Such procedure necessitated introduction of a proper amount of suitable lubricant into the universal joint housings at the time of final assembly into the automobile, and furthermore it required introduction of the compression spring into the housing at the time of final assembly. This practice resulted in occasional failures to put lubricant into the housing at the time of final assembly and the work of joining up the propeller shaft to the companion flanges on the transmission shaft and axle pinion shaft respectively was materially slowed up by the difficulty the assembly man had in placing the compression spring in position.

In the present construction, the flanged end of the universal joint housing is provided with a permanent cover plate with a gasket interposed for sealing the housing and at the same time providing a permanent seat for the compression spring. The proper amount of suitable lubricant may be placed into the universal joint housing at the time of its manufacture and assembly and the spring properly positioned therein so that the propeller shaft assembly with joints thereon may reach the automobile assembly line as a single complete unit ready for bolting to the respective companion flanges of the transmission shaft and axle pinion shaft.

In the construction shown in the drawing, a tubular propeller shaft 8 is provided at its opposite ends with universal joints of the character shown and described in detail in the copending U. S. application for patent of Archibald A. Warner, Serial No. 637,615, filed October 13, 1932, now matured into Patent Number 1,921,274 issued October 13, 1933.

Figure 2:
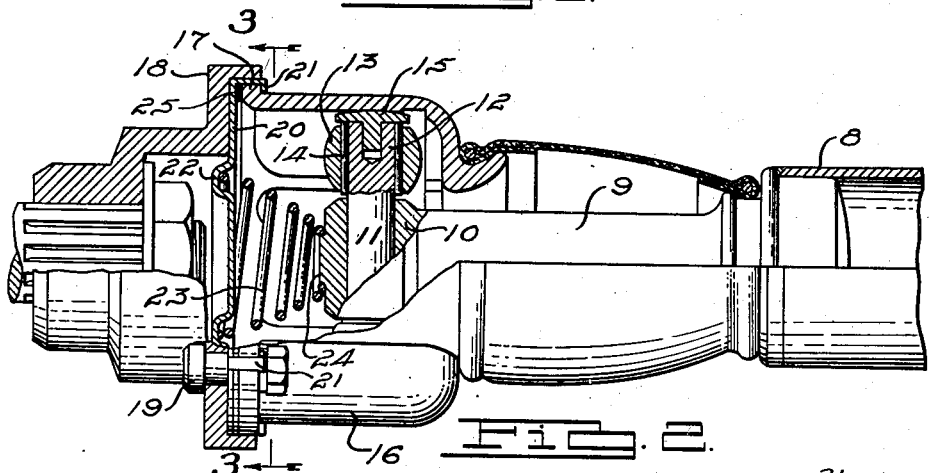
Fig. 2 is an enlarged sectional view taken on the line 2—2 of Fig. 1 looking in the direction indicated by the arrows.
Figure 3:
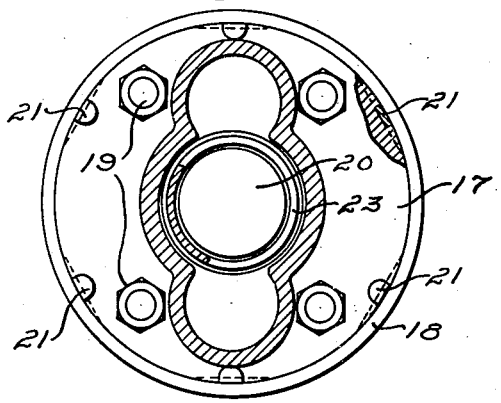
Fig. 3 is a sectional view taken on the line 3—3 of Fig. 2, looking in the direction indicated by the arrows.
Figure 4:
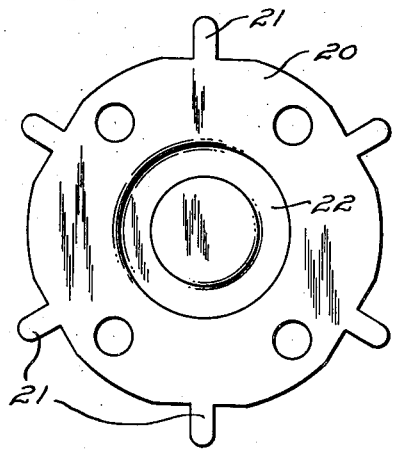
Fig. 4 is a plane or face view of the improved closure plate or cap.
Figure 5:
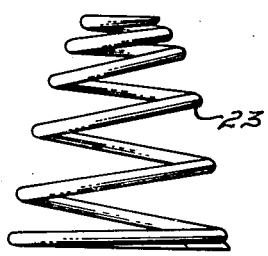
Fig. 5 is a view in elevation of the helical spiral spring used in conjunction with the cover plate.
Figure 6:
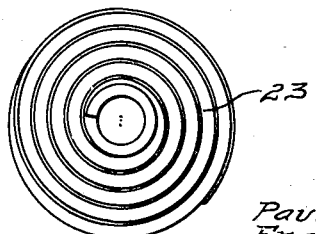
Fig. 6 is a top plane view of the same.

As shown in Figs. 2 and 3 of the drawing, the joint comprises generally a shank 9 having a head 10 which is provided with a bore disposed perpendicular to the axis of the shank 9 for receiving a transversely disposed pin 11. The opposite ends of the pin 11 project equal distances at opposite sides of the head 10 thus providing trunnions 12 upon which are journaled truncated balls 13 by means of roller bearings 14. The ends of the trunnions 12 are each provided with an axial bore for receiving the shank of an end thrust member or cap 15 which bears radially against the housing 16 for centering the joint. The truncated balls 13 are snugly embraced in tubular bores formed in the housing 16 in spaced parallel relation to the axis of the housing.

The shank 9 extends into one end of the housing and the opposite end thereof terminates in a radially extending annular flange 17 which is adapted to be secured to a companion flange 18 by bolts or the like 19.

A cover plate 20, which is provided with a plurality of radially extending tabs 21 is permanently secured to the flanged end of the housing 16 by bending the tabs 21 over the flange 17 of the housing. The flange is cut back in registry with the tabs a distance equal to the thickness thereof so that when the tabs are bent around the flange no portion thereof will project beyond the extended circumference of the flange. This recessing of the tabs permits the housing to be assembled into the annular recessed seat of the companion flange 18, thus insuring correct centering of the joint.

The cover plate 21 is provided with a concentrically disposed annular groove or seat 22 which receives and holds in position the large end of a helical spiral spring 23, the other end of which surroundingly engages a boss 24 concentrically formed on the axially terminating head 10. A suitable gasket 25 is interposed between the cover plate 20 and housing flange 17 for sealing lubricant within the housing and excluding dirt and dust therefrom prior to final assembly on the companion flange 18.

In the operation and use of this improved invention, the universal joints and propeller shafts are assembled in the usual manner, a correct amount of suitable lubricant introduced into the housing 16, the helical spiral spring 23 seated in the groove 22 of cover plate 20, and then the cover plate is positioned against the flange 17 with the gasket 25 interposed therebetween. The tabs 21 are then bent around the flange 17, as shown in Figs. 2 and 3 of the drawing, thus permanently closing the flanged end of the housing and providing a seat for the large end of the spring 23.

This permanent closure seals in the lubricant and excludes dust and dirt prior to final assembly on an automobile. Such a construction provides a unitary assembly which may be readily placed in position against its companion flanges and bolted thereto on the assembly line without the assembly workmen bothering with the insertion of lubricant, springs or other loose parts.

Although but one specific embodiment of this invention has been herein shown and described, it will be understood that numerous details of the construction shown may be altered or omitted without departing from the spirit of this invention as defined by the following claim.

We claim:

In a universal joint, a housing having an open end surrounded by a radially extending attaching flange, a cover plate substantially co-extensive with said flanged end, and a plurality of tabs on said plate for engaging said housing flange, said flange being recessed in registry with and to a depth substantially equal to the thickness of said tabs.

PAUL B. GODDARD.
FRANK KETCHAM.